United States Patent [19]
Casey et al.

[11] Patent Number: 5,768,061
[45] Date of Patent: Jun. 16, 1998

[54] LOW-INERTIA ACTUATOR COIL FOR A DISK DRIVE

[75] Inventors: Shawn Casey, San Jose; Mats Anders Engwall, Hollister; Martin John McCaslin, Pleasanton, all of Calif.

[73] Assignee: Western Digital Corporation, Irvine, Calif.

[21] Appl. No.: 794,133

[22] Filed: Feb. 3, 1997

[51] Int. Cl.$^6$ .............................. G11B 5/55; G11B 21/08
[52] U.S. Cl. .................................................. 360/106
[58] Field of Search .......................... 360/106; 310/40 R

[56] References Cited

U.S. PATENT DOCUMENTS

| | | |
|---|---|---|
| 2,766,407 | 10/1956 | Sanford . |
| 4,633,456 | 12/1986 | Luecke ............................ 369/45 |
| 4,775,908 | 10/1988 | Ycas .............................. 360/106 |
| 4,835,643 | 5/1989 | Schulze ........................... 360/106 |
| 5,005,095 | 4/1991 | Wagner ........................... 360/106 |
| 5,016,131 | 5/1991 | Riggle et al. ................... 360/106 |
| 5,050,026 | 9/1991 | Goss .............................. 360/106 |
| 5,119,253 | 6/1992 | Kotani ............................ 360/106 |
| 5,224,000 | 6/1993 | Casey et al. .................... 360/105 |
| 5,247,410 | 9/1993 | Ebihara et al. .................. 360/106 |
| 5,442,505 | 8/1995 | Forord ............................ 360/106 |
| 5,448,437 | 9/1995 | Katahara ........................ 360/106 |
| 5,459,362 | 10/1995 | Dunfield et al. ................ 310/154 |
| 5,475,549 | 12/1995 | Marder et al. .................. 360/106 |
| 5,621,591 | 4/1997 | Rahimi et al. .................. 360/106 |
| 5,666,244 | 9/1997 | Ogawa ........................... 360/106 |

*Primary Examiner*—Robert S. Tupper
*Attorney, Agent, or Firm*—Leo J. Young; W. Chris Kim

[57] ABSTRACT

A head stack assembly for a disk drive includes a swing-type structure, a head gimbal assembly, and a coil. The swing-type structure has a bore defining a bore axis. The head gimbal assembly is cantilevered from the swing-type structure to project radially away from the bore axis. The head gimbal assembly includes transducing structure for writing to and reading from the recording surface of a disk. The coil is cantilevered from the swing-type structure to project radially away from the bore axis in a direction opposite from the head gimbal assembly. The coil has a shape to provide a current flow path that includes first and second multi-leg portions that are spaced from each other in a direction parallel to the bore axis. Each of the multi-leg portions is generally C-shaped, substantially perpendicular to the bore axis, open at its end that is remote from the bore axis, and includes two radially-extending legs such that the current flow path provides four radially-extending legs with the four radially-extending legs being positioned such that upon installation of the head stack assembly into the disk drive the four radially-extending legs occupy an annular region in which a magnetic field distribution exists.

22 Claims, 8 Drawing Sheets

Contribution
to Inertia
coil end

Fig. 6A
Flux Entering Center Yoke

Fig. 6B
Flux Exiting Center Yoke

LOW-INERTIA ACTUATOR COIL FOR A DISK DRIVE

BACKGROUND OF THE INVENTION

1. Field of the Invention

This invention relates to a head disk assembly for a hard disk drive. More particularly, this invention relates to an improved actuator arrangement for the head disk assembly.

2. Description of the Prior Art and Related Information

A typical contemporary hard disk drive includes a printed circuit board assembly and a head disk assembly. The printed circuit board assembly includes circuitry for processing signals and controlling operations of the drive. The head disk assembly (often referred to as the "HDA") includes an enclosure including a base and a cover; at least one disk having at least one recording surface; a spindle motor for causing each disk to rotate, and certain components that collectively define an actuator.

Actuators can be classified in various ways. One way of classifying actuators divides actuators into stepper motor driven actuators (which had been used in disk drives designed years ago) and voice coil motor driven actuators. U.S. Pat. No. 5,459,362 (the '362 patent) and U.S. Pat. No. 5,448,437 (the '437 patent) disclose disk drives that each employ a voice coil motor driven actuator. Another way of classifying actuators divides actuators into linear actuators and rotary actuators. The '437 patent contains background information relating to a linear voice coil motor driven actuator as well as various rotary, voice coil motor driven actuators. Substantially all contemporary, cost-competitive disk drives employ a rotary, voice coil motor driven actuator, which is hereinafter referred to briefly as a rotary VCM actuator. The '437 patent discloses a rotary VCM actuator that employs an L-shaped coil. The '362 patent discloses a rotary VCM actuator that employs a coil bobbin that is generally referred to in this art as a "flat coil" having four legs, and which is oriented within the disk drive such that two of the legs extend circumferentially relative to the disks and such that the other two legs extend radially relative to the disks. U.S. Pat. No. 5,050,026 discloses a rotary VCM actuator for a disk drive with the actuator employing a coil oriented such that substantially the entire voice coil is located at a constant radial separation from the pivot axis. U.S. Pat. No. 4,835,643 (the '643 patent) discloses various embodiments of a rotary VCM actuator for a disk drive, each embodiment of which includes a bent coil having angularly spaced-apart radially-extending portions and joining perpendicular portions that each have the shape of an arch extending between the radially-extending portions. In a depicted embodiment, the '543 patent teaches an arrangement in which a pair of bent coils are positioned back-to-back to define an H-shaped structure.

Certain parameters relating to rotary VCM actuators play an important role in the overall design of a disk drive. These parameters include: a) a torque constant—usually denoted as "$K_t$"; and b) a moment of inertia (i. e, the moment of inertia of the structure commonly referred to as a head stack assembly or "HSA.") $K_t$ has the units of torque per unit of current. The units of torque can be expressed in English units such as inch-ounces or can be expressed in metric units such as grm-cm. The units of current can be expressed in amperes or smaller units such as milliamps. The units of moment of inertia can be expressed in gm-cm$^2$. Other structures (within the pivot bearing cartridge) have a somewhat related role in the overall design of the disk drive, particularly with respect to stiffness but much less so with respect to moment of inertia. The contribution to overall moment of inertia attributable to the pivot bearing cartridge is substantially less than that of the HSA. As for the HSA, it typically includes a flex circuit assembly that has potential impact on bias torque of the HSA but little effect on the moment of inertia of the HSA. The major subassembly of a typical HSA that most substantially affects the moment of inertia involves: a) ring-shaped structure (whether a stacked arrangement of components or a unitary body of a structure called an "E-block") that defines a bore for surrounding the pivot bearing cartridge; a set of cantilevered arms (whether stacked or overmolded to the ring-shaped structure or the arms of the E-block); the head gimbal assemblies; and the coil and its support structure for holding it cantilevered from the ring-shaped structure.

Generally, it is desirable to have a relatively high ratio between torque constant and moment of inertia. Having such a relatively high ratio facilitates rapid acceleration and deceleration during a track seek operation. Prior art rotary VCM actuators have certain problems that make it difficult to achieve a high ratio of torque constant to moment of inertia; such problems will now be discussed.

Figure 1:
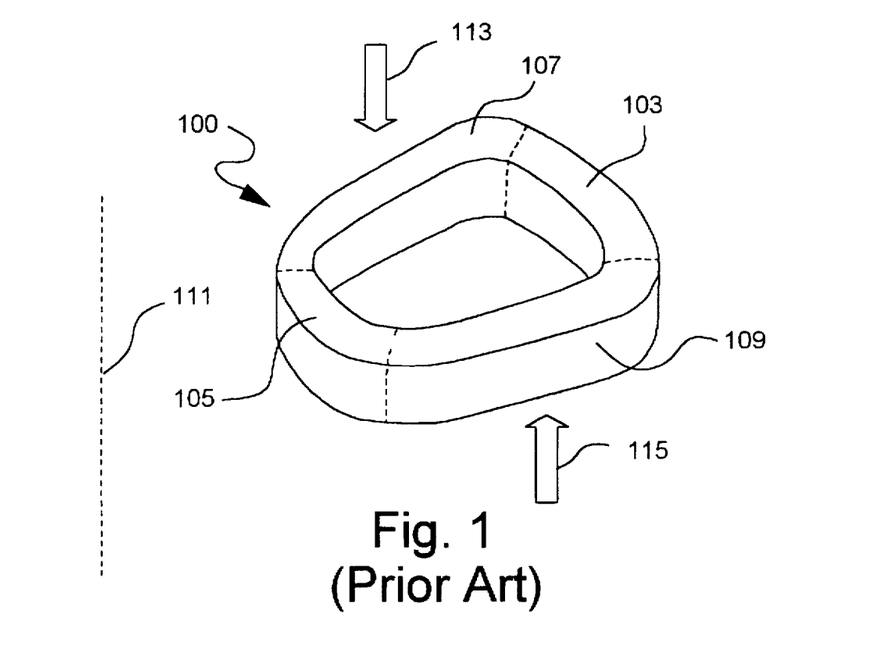
FIG. 1 is an isometric view of a prior art coil occupying a region in which a magnetic field distribution exists.

As shown in FIG. 1, a representative prior art flat coil 100 has the shape of a relatively flat loop which includes two circumferentially-extending legs 103 and 105, and two radially-extending legs 107 and 109. Dashed lines are shown in FIG. 1 to indicate the division of flat coil 100 into its various legs. While installed within a head disk assembly, coil 100 is supported to project away from a bore axis or pivot axis indicated by a dashed line at 111, and to occupy an annular region in which a magnetic field distribution exists. A vector 113 represents the direction of magnetic flux in the portion of the annular region that radially-extending leg 107 occupies. A vector 115 represents the direction of magnetic flux in the portion of the annular region that radially-extending leg 109 occupies.

In operation, current flows through coil 100, and torque is generated because electromagnetically-caused forces are imposed on radially-extending legs 107 and 109. The direction of the generated torque (whether clockwise or counterclockwise) depends upon the direction of current flow through coil 100. The magnitude of the generated torque depends on numerous factors including the magnitude of the current, the number of turns in coil 100, the distance between the midpoints of radially extending legs 107 and 109 and the pivot axis, and the magnitude and direction of ambient magnetic flux (the magnetic flux vector being represented by arrows 113 and 115). The torque constant, $K_t$ is independent of the magnitude of the current but otherwise dependent on the same factors referred to above.

As for circumferentially-extending legs 103 and 105, no useful torque is generated by electromagnetically-caused forces imposed on them because these forces are directed radially (either toward or away from the pivot axis). Circumferentially-extending leg 103 not only fails to contribute to the torque constant, it also adversely affects the moment of inertia. It is positioned such that while in being in place within the HDA it is most distant from pivot axis 111. Because the moment of inertia for a rotating body is proportional to the square of the distance from the axis of rotation, circumferentially-extending leg 103 substantially increases the moment of inertia of the HSA 133.

Figures 2, 2A, 2B:
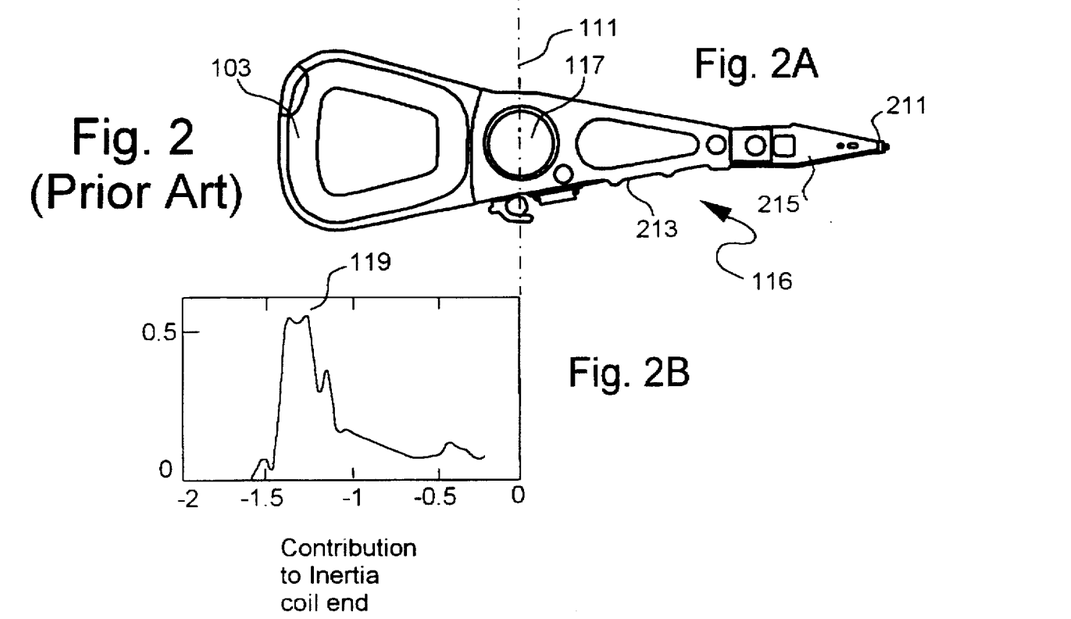

FIGS. 2a and 2b provide a representative example of the adverse effect that a circumferentially-extending leg such as leg 103 has on moment of inertia of an HSA subassembly 116. In the graph of FIG. 2b, the abscissa or "X" axis represents distance from a bore axis 111 shown extending down from a bore 117 in FIG. 2a to the origin of the graph of FIG. 2b. The ordinate or "Y" axis represents the contribution to moment of inertia ("I") from the portions of the subassembly in units of $\Delta I/\Delta x$. The integral of the function depicted by the curve in FIG. 2b constitutes the moment of inertia of the portion of the subassembly to the left of bore axis 111. A peak 119 in the graph of FIG. 2b is aligned under circumferentially-extending leg 103, and the magnitude of this peak demonstrates that the adverse effect of circumferentially-extending leg 103 on moment of inertia of subassembly 116 is severe.

The problems discussed above with specific reference to a flat coil are also involved in other prior art coils. For example, the H-shaped arrangement taught in the '543 patent includes two perpendicular portions of an upper half and two perpendicular portions of a lower half, with none of the four perpendicular portions being effective to contribute to the torque constant.

SUMMARY OF THE INVENTION

This invention can be regarded as a head stack assembly for a disk drive. The head stack assembly includes a swing-type structure, a head gimbal assembly, and a coil. The swing-type structure has a bore defining a bore axis. The head gimbal assembly is cantilevered from the swing-type structure to project radially away from the bore axis. The head gimbal assembly includes transducing structure for writing to and reading from the recording surface of a disk. The transducing structure can be a single inductive transducer such as a thin film head, or a structure including an magnetoresistive (MR) element for reading and an inductive element for writing.

Figure 4:
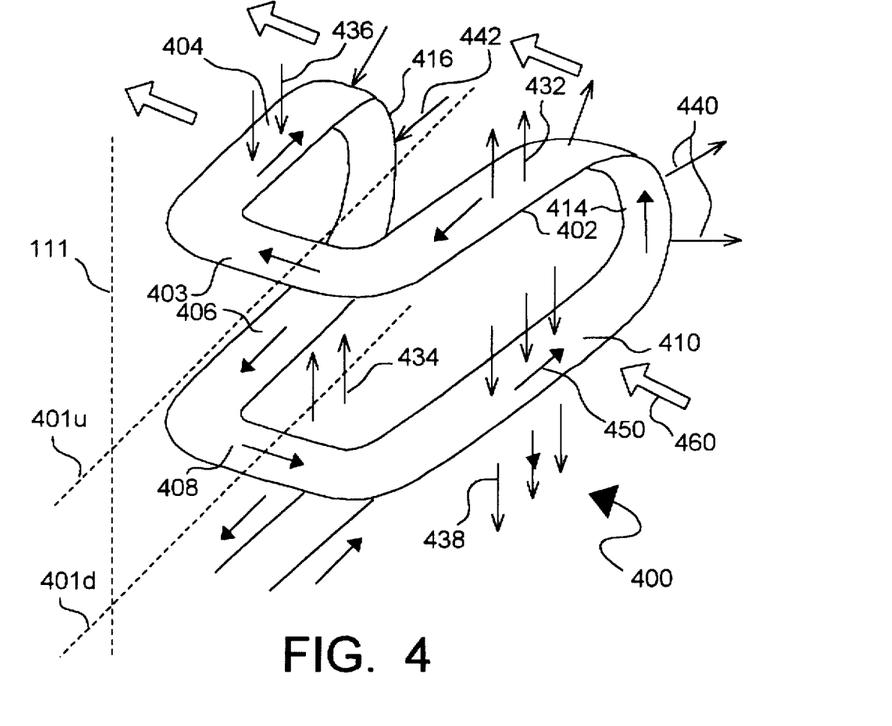
FIG. 4 is an isometric view of a low-inertia actuator coil having a shape to provide a current flow path in the presence of a magnetic field distribution in accordance with the teachings of this invention.

The coil is cantilevered from the swing-type structure to project radially away from the bore axis in a direction opposite from the head gimbal assembly. The coil has a shape to provide a current flow path that includes first and second multi-leg portions that are spaced from each other in a direction parallel to the bore axis. Each of the multi-leg portions is generally C-shaped, substantially perpendicular to the bore axis, open at its end that is remote from the bore axis, and includes two radially-extending legs such that the current flow path provides four radially-extending legs with the four radially-extending legs being positioned such that upon installation of the head stack assembly into the disk drive the four radially-extending legs occupy an annular region in which a magnetic field distribution exists. In the preferred embodiment, the first C-shaped multi-leg portion (as shown in FIG. 4 as comprising a radially extending leg 402, a circumferentially extending leg 403, and a radially extending leg 404) connects to the second C-shaped multi-leg portion (as shown in FIG. 4 as comprising a radially extending leg 406, a circumferentially extending leg 408, and a radially extending leg 410) by substantially perpendicular or axially-extending legs (as shown in FIG. 4 as legs 414 and 416).

A head stack assembly embodying the invention has numerous advantages. Because each multi-leg portion of the current flow path is open at its end that is remote from the bore axis, the coil has the advantage of providing for a relatively low moment of inertia of the HSA. The improvement arising from the coil itself constitutes enabling technology for other improvements in the HSA. Preferably, a HSA is mass balanced; that is, the mass on the HGA side of the bore is balanced by the mass on the coil side. Reducing the mass on the coil side enables technology for reduced mass on the other side to be put to practical use has the advantage of relatively low moment of inertia. Because the multi-leg portions of the current flow path provide four radially-extending legs, it is possible for the HSA to provide a high torque constant. With increased torque constant and reduced moment of inertia, the HSA can provide a large improvement in the ratio of torque constant to moment of inertia.

This invention can also be regarded as a head disk assembly for a disk drive. The head disk assembly includes an enclosure; a disk having a recording surface; a pivot bearing cartridge affixed to the enclosure and defining a pivot axis; a head stack assembly; and means for generating a magnetic field distribution in an annular region. The head stack assembly has a bore surrounding the pivot bearing cartridge, transducing structure, cantilevered structure for supporting the transducing structure in position over a selected area of the recording surface, and a coil cantilevered to project away from the pivot axis in a direction opposite from the cantilevered structure. The coil has a shape to provide a current flow path that includes first and second multi-leg portions that are spaced from each other in a direction parallel to the pivot axis, each of the multi-leg portions being generally C-shaped, substantially perpendicular to the pivot axis, open at its end that is remote from the pivot axis, and including two radially extending legs such that current flow path provides four radially-extending legs. The generating means generates a magnetic field distribution such that through a predetermined arc two of the four radially-extending legs occupy a substantially uniform magnetic field having a first direction and the other two of the four radially-extending legs occupy a substantially uniform magnetic field having a second, opposite direction.

This invention can also be regarded as a disk drive comprising a head disk assembly including a head disk assembly having the elements summarized above, and further including circuit means for supplying current to flow through the coil to produce torque about the pivot axis.

BRIEF DESCRIPTION OF THE DRAWINGS

FIG. 2a and FIG. 2b are related; FIG. 2a is a plan view of a subassembly of a prior art head stack assembly incorporating a prior art flat coil like the coil of FIG. 1, and FIG. 2b is a graph showing the extent to which a circumferential leg 103 adversely increases the moment of inertia of the subassembly of FIG. 2a;

DESCRIPTION OF THE PREFERRED EMBODIMENT

Figure 3:
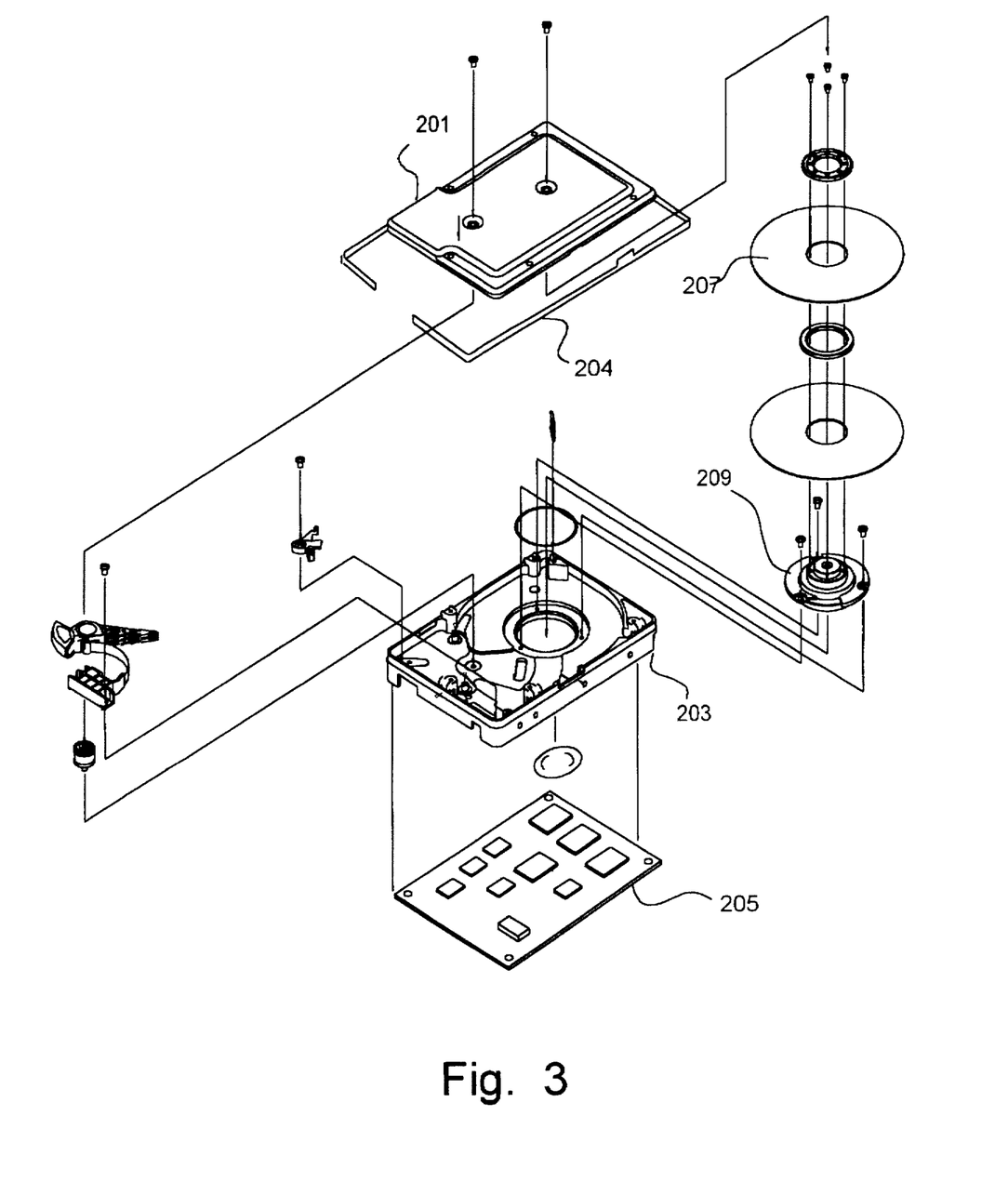
FIG. 3 is an exploded view of a printed circuit board assembly and certain components of a head disk assembly for a disk drive that provides a suitable environment for a preferred embodiment of this invention.

In FIG. 3, certain components incorporated in a disk drive include a cover 201, a base 203, and a tape seal 204 that define an enclosure. In the terminology used in this art, the enclosure and the components it encloses are referred to as a head disk assembly or HDA. The disk drive includes the HDA and a printed circuit board assembly (PCBA) 205. The HDA includes a disk having a recording surface 207, and structure including a spindle motor 209 for causing the disk to rotate at a substantially constant velocity during normal operation. In the particular embodiment depicted in FIG. 3, the disk drive includes two disks providing four recording surfaces. As discussed more fully below, the HDA further includes a pivot bearing cartridge affixed to the enclosure and defining a pivot axis; a head stack assembly (HSA); and means for generating a magnetic field distribution in an annular region. The HSA has a bore such as bore 117 shown in FIG. 2a for surrounding the pivot bearing cartridge, transducing structure suitably incorporated in a slider such as slider 211 shown in FIG. 2a, cantilevered structure such as arm 213 and load beam 215 shown in FIG. 2a for supporting the transducing structure in position over a selected area of the recording surface. In the terminology used in this art, a load beam such as load beam 215 and attached slider such as slider 211 are referred to as a head gimbal assembly (HGA).

In accordance with the teachings of this invention, the HSA includes a low-inertia actuator coil cantilevered to project away from the pivot axis in a direction opposite from the cantilevered structure that supports slider 211.

Reference is now made to FIG. 4 for a discussion of the shape of a low-inertia actuator coil 400 that is suitable for incorporation into an embodiment of this invention. While incorporated within an HDA, coil 400 is cantilevered to project away from axis 111 (the common axis of the HSA bore and the pivot axis defined by the pivot bearing cartridge) and to occupy an annular region in which a magnetic field distribution exists. PCBA 205 includes circuit structure for supplying current to flow through coil 400 to produce torque on the HSA about axis 111. Suitable circuit structure is a well-known high-impedance output amplifier circuit.

Coil 400 has a shape that resembles the perimeter of a taco shell. Its shape provides a current flow path that includes first and second multi-leg portions that are spaced from each other in a direction parallel to axis 111. The spacing in the direction parallel to axis 111 is indicated in FIG. 4 by dashed lines 401*u* and 401*d*. The first multi-leg portion includes a radially extending leg 402, a circumferentially extending leg 403, and a radially extending leg 404. The first multi-leg portion is generally C-shaped as can be seen in the view of FIG. 4, and is open at its end that is remote from axis 111.

The second multi-leg portion is also generally C-shaped and open at its end that is remote from axis 111. The second multi-leg portion includes a radially extending leg 406, a circumferentially extending leg 408, and a radially extending leg 410. The current flow path further includes a leg 414 and a leg 416 that each extend substantially axially (perpendicular to the first and second multi-leg portions). Substantially axially-extending leg 414 connects radially extending legs 402 and 410 in series, and substantially axially-extending leg 416 connects radially extending legs 404 and 406 in series.

Thus, the current flow path provided by the shape of coil 400 has a total of four radially-extending legs (legs 402, 404, 406, and 410). Two of the four radially-extending legs occupy a substantially uniform magnetic field having a first direction and the other two of the four radially-extending legs occupy a substantially uniform magnetic field having a second, opposite direction. In FIG. 4, each of various arrows represents a magnetic flux vector. Arrows 432 represent the magnetic flux vector in the portion of the annular region that radially-extending leg 402 occupies in the condition illustrated in FIG. 4. Arrows 434 represent the magnetic flux vector in the portion of the annular region that radially-extending leg 406 occupies in the condition illustrated in FIG. 4. As indicated by the common upward direction of arrows 432 and 434, each of radially-extending leg 402 and radially-extending leg 406 (which are spaced apart both circumferentially and in an axial direction [parallel to axis 111]) occupies a substantially uniform magnetic field having a first direction. Similarly, as indicated by the common downward direction of arrows 436 and 438, each of radially-extending leg 404 and radially-extending leg 410 (which are spaced apart both circumferentially and in a direction parallel to axis 111) occupies a substantially uniform magnetic field having a second direction. Preferably, the magnetic field distribution is such that magnetic flux vectors point in a direction perpendicular to substantially axially-extending legs 414 and 416. As indicated by the outbound radial direction of arrows 440, substantially axially-extending leg 414 occupies a substantially uniform magnetic field having an outbound radial direction. On the other hand, as indicated by the inbound radial direction of arrows 442, substantially axially-extending leg 416 occupies a substantially uniform magnetic field having an inbound radial direction.

In use, coil 400 is electrically connected to circuit means suitably positioned on PCBA 205 (FIG. 3). In operation, the circuit means causes current (indicated in FIG. 4 by arrow 450 and others) to flow in series through the legs of the current flow path defined by the shape of coil 400. While current flows through leg 410 in a radially outbound direction as represented by current flow arrow 450, an electromagnetically caused force is imposed on leg 410 in the direction of arrow 460. This force on leg 410 produces a torque about axis 111 that is in the counter-clockwise direction as viewed in FIG. 4. The series current flows through substantially axially-extending leg 414 in an upward direction, resulting in a torque-producing force that likewise is in the counter-clockwise direction. The series current flows through leg 402 in a radially inbound direction, resulting in a torque-producing force that likewise is in the counterclockwise direction. The series current flows through circumferentially-extending leg 403 in the counterclockwise direction, but this section of the current flow path is not in a magnetic field directed for resulting in a force contributing to the generated torque (there is no need to provide for a magnetic field in the region occupied by circumferentially-extending leg 403, and ambient magnetic field that might be directed perpendicular to circumferentially-extending leg 403 would result in a radially-directed force that does not contribute to the generated torque). The series current flows through leg 404 in a radially outbound direction, resulting in a torque-producing force that likewise is in the counter-clockwise direction. The series current flows through substantially axially-extending leg 416 in an downward direction, resulting in a torque-producing force that likewise is in the counter-clockwise direction. The series current flows through leg 406 in a radially inbound direction, resulting in a torque-producing force that likewise is in the counter-clockwise direction. The series current flows through circumferentially-extending leg 408 in the clockwise direction, but this section of the current flow path (like that of leg 403) is not in a magnetic field directed for resulting in a force contributing to the generated torque. Thus, in embodiment depicted in FIG. 4, six out of eight of the legs contribute to generating torque, and the omission of an outer circumferentially-extending leg provides a basis for a low moment of inertia.

The direction of the generated torque (whether clockwise or counterclockwise) depends upon the direction of current flow through coil 400. The magnitude of the generated torque depends on numerous factors including the magnitude of the current, the number of turns in coil 400, the distance between the midpoints of the four radially extending legs and axis 111, the distance between the two substantially axially-extending legs and axis 111, and the magnitude and direction of ambient magnetic flux. The torque constant, $K_t$ is independent of the magnitude of the current but otherwise dependent on the same factors referred to above.

Figure 5:
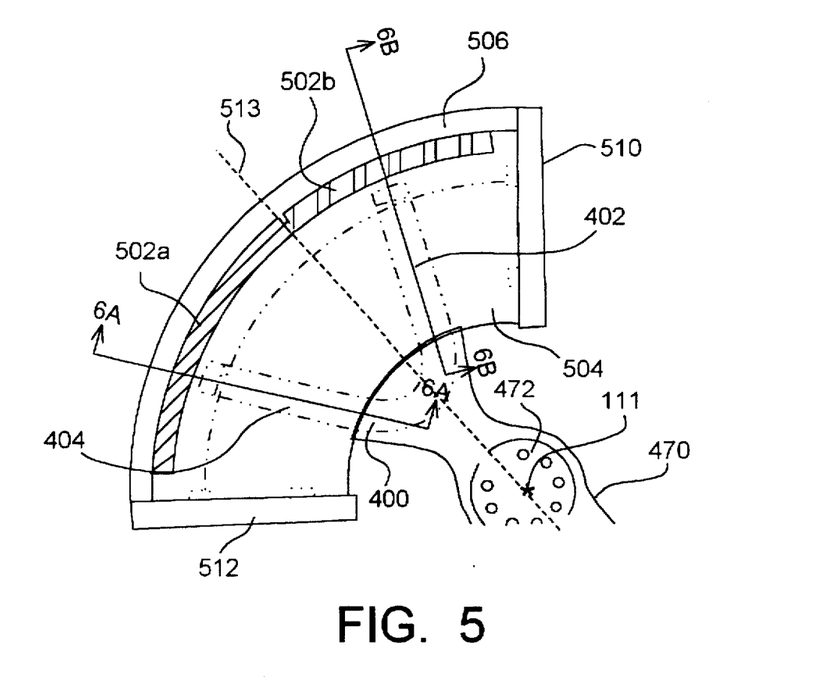
FIG. 5 is a top view of a cantilevered low-inertia actuator coil and cooperating magnetic field distribution generating structure in accordance with the teachings of this invention.
Figure 6A:
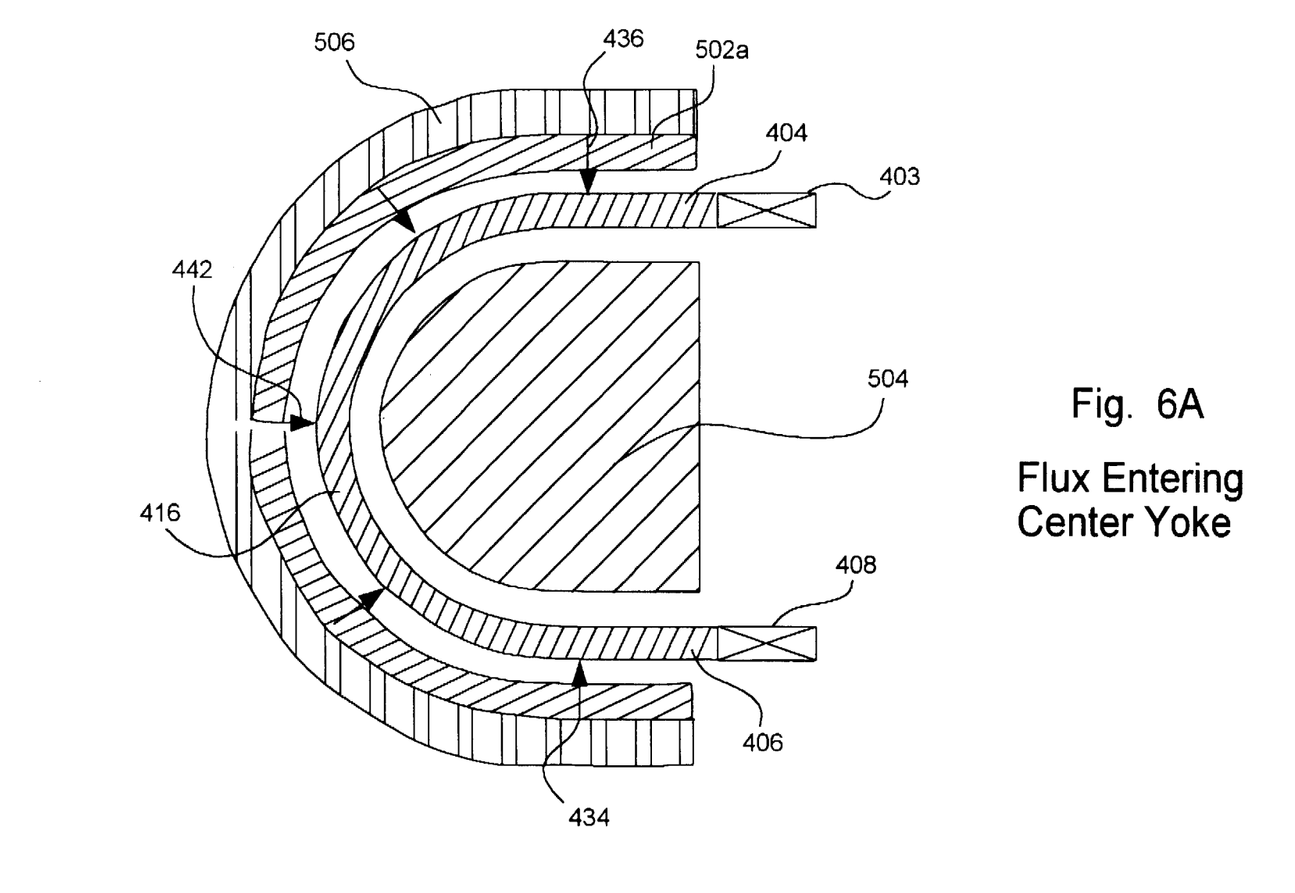
FIGS. 6A and 6B are cross-sectional views of the arrangement of FIG. 5.
Figure 6B:
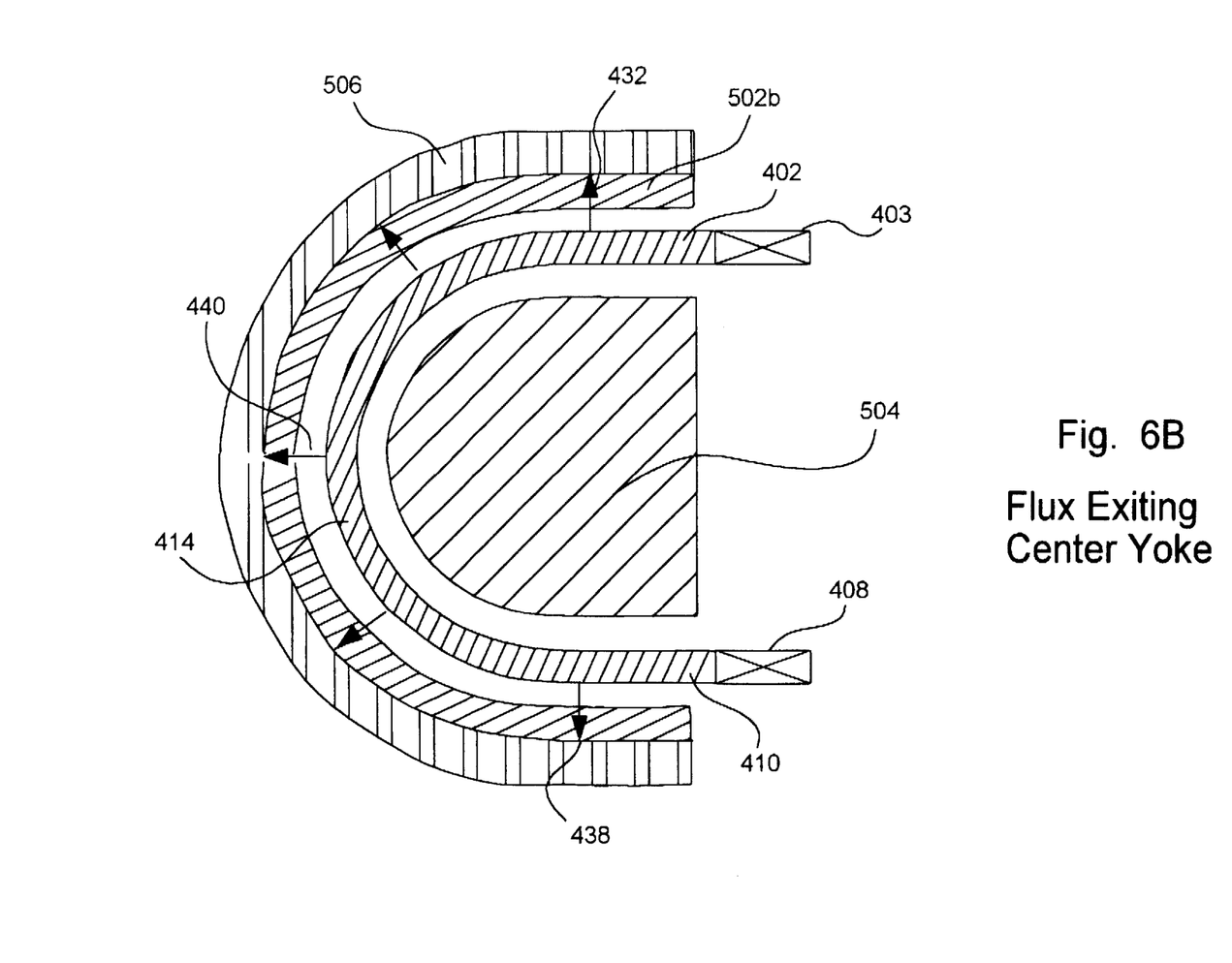

With reference to FIGS. 5, 6a, and 6b, there will now be described suitable structure for generating a magnetic field distribution in an annular region occupied by coil 400, and suitable components providing the environment for such structure.

As shown in FIG. 5, a portion of the HSA includes a swing-type structure 470 that is preferably light and stiff and has a bore surrounding a pivot bearing cartridge 472. The HSA bore and pivot bearing cartridge 472 each define the same axis, i. e., axis 111 which extends perpendicular to base 203 (FIG. 3). A coil-containing wing supports coil 400 such that coil 400 is cantilevered from swing-type structure 470 to project radially away from axis 111 in a direction opposite from each head gimbal assembly (not shown in FIG. 5) of the HSA. In one embodiment, the coil-containing wing is prefabricated by a plastic overmolding process, and the prefabricated wing is then attached to swing-type structure 470 by another plastic overmolding process. Alternatively, the coil is attached as described below with respect to a process involving pinching of the coil incident to integrating it into the HSA.

A nested support structure provides support for a permanent magnet arrangement that in the preferred embodiment comprises two permanent magnets referenced at 502a and 502b. The nested support structure includes an inner yoke 504, an outer yoke 506, an a pair of end caps 510 and 512. Inner yoke 504, when viewed from above, has the shape of a portion of an annulus and extends from end cap 510 to end cap 512. Outer yoke 506 is U-shaped in cross section as shown in FIGS. 6a and 6b, whereby it provides an inner surface for supporting magnets 502a (FIG. 6a) and magnets 502b (FIG. 6b). Each of magnets 502a and 502b has a "north" magnetic surface and a "south" magnetic surface. These surfaces are the major surfaces that face inwardly and outwardly. Magnets 502a extend in a circumferential direction from a radial line near end cap 512 to approximately the center line (513) of outer yoke 506. The range of angular motion of the HSA is such that the following positions are reached. While leg 404 occupies its most counterclockwise position, leg 402 is positioned next to the most counterclockwise portion of magnets 502b. At the other end of the arc of motion (while leg 402 occupies its most clockwise position), leg 404 is positioned next to the most clockwise portion of magnets 502a.

As shown in FIG. 6a, magnets 502a are arranged so that magnetic flux vectors are oriented as follows: As indicated by arrow 436, flux extends downwardly from yoke 506 through radially-extending leg 404 and into yoke 504; as indicated by arrow 442, flux extends radially inbound from yoke 506 through substantially axially-extending leg 416 and into yoke 504; and as indicated by arrow 434, flux extends upwardly from yoke 506 through radially-extending leg 406 into yoke 504. The flux entering yoke 504 from magnets 502a exits yoke 504 as indicated in FIG. 6b. As shown in FIG. 6b: flux indicated by arrow 432 extends upwardly from yoke 504 through magnets 502b into yoke 506; flux indicated by arrow 440 extends outbound from yoke 504 through magnets 502b into yoke 506; and flux indicated by arrow 438 extends downwardly from yoke 504 through magnets 502b into yoke 506.

Figure 7:
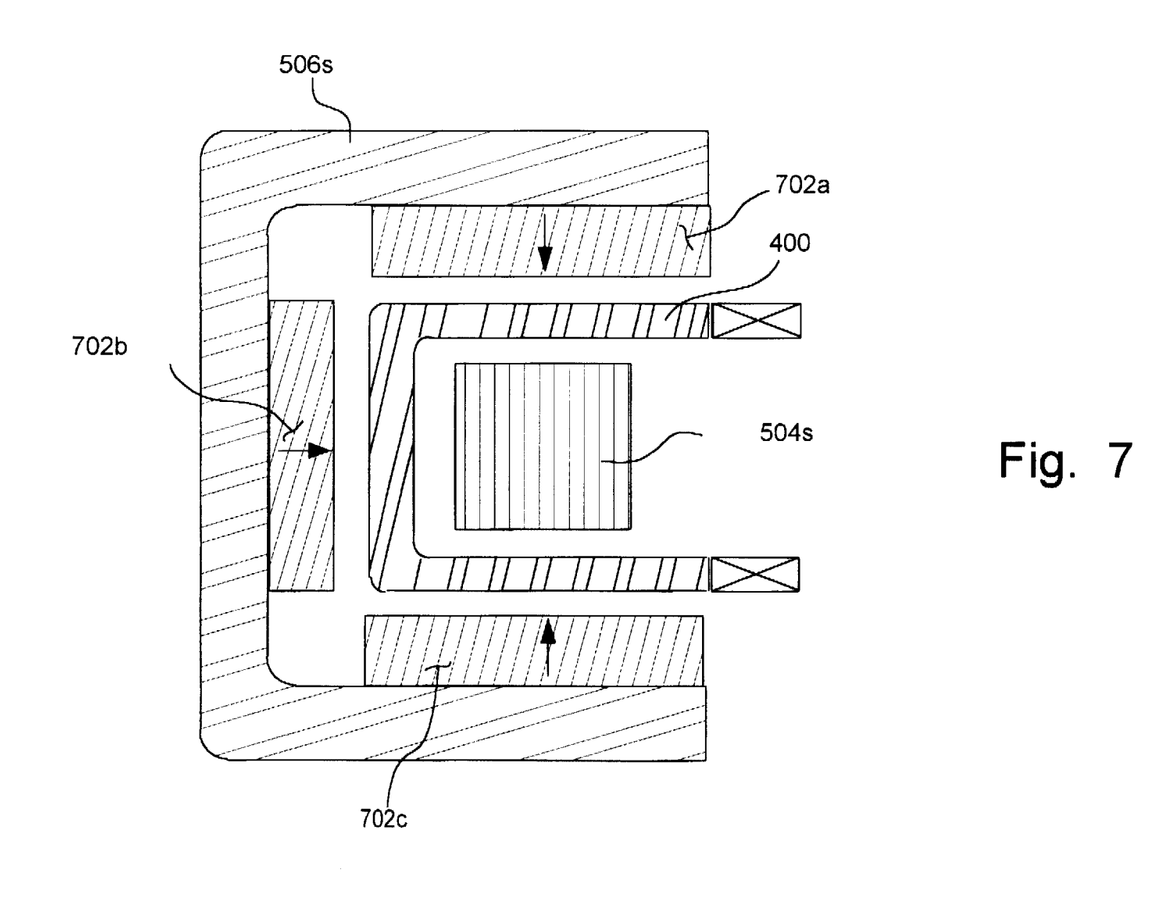
FIG. 7 is a cross-sectional view of an arrangement that constitutes an alternative to the arrangement depicted in FIG. 5.

With reference to FIG. 7, an alternative embodiment employs an inner yoke 504s that is square in cross section, an outer yoke 506s having a cross section in the shape of a block "U," and magnets 702a, 702b, and 702c affixed to the three inner facing surfaces of yoke 506s in an arrangement to produce the appropriate magnetic field distribution in accordance with the teachings hereof.

Figure 8:
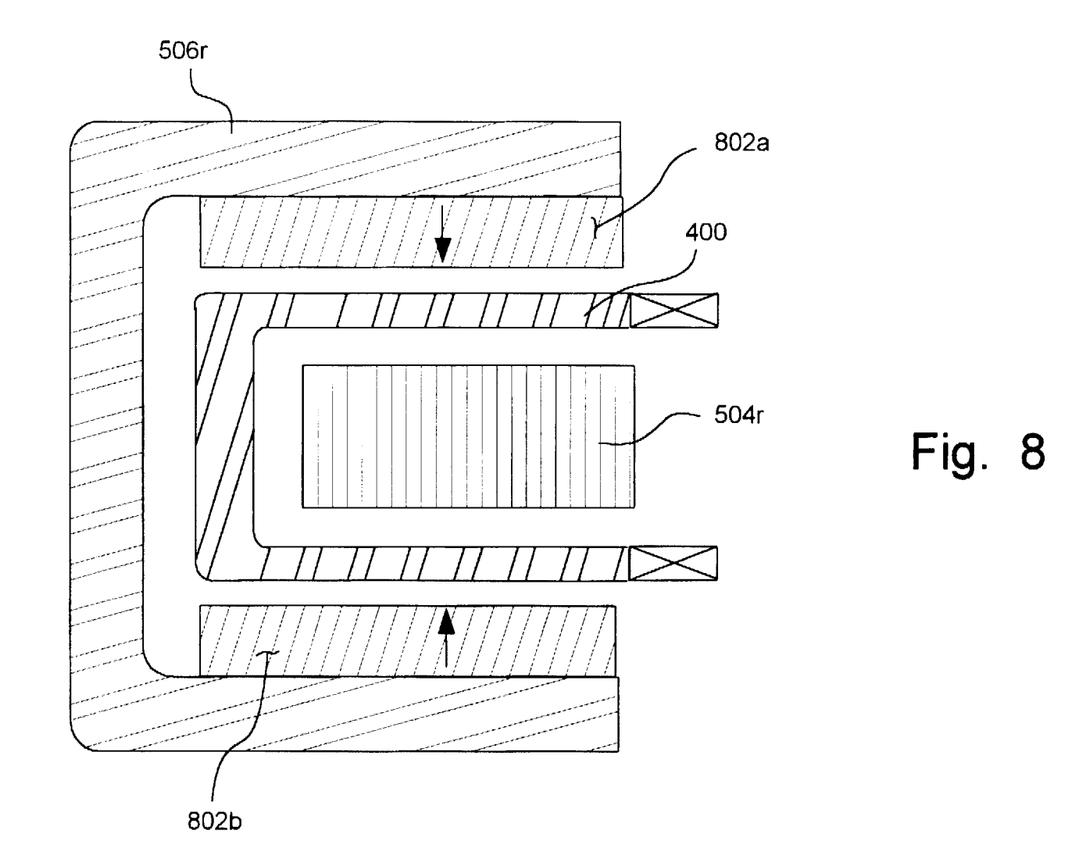
FIG. 8 is a cross-sectional view of an arrangement that constitutes an alternative to the arrangements depicted in FIGS. 5 and 7.

With reference to FIG. 8, an alternative embodiment employs an inner yoke 504r that is rectangular in cross section, an outer yoke 506r having a cross section similar to that of outer yoke 506s, and magnets 802a and 802b affixed to the upper and lower inner facing surfaces of yoke 506r in an arrangement to produce the appropriate magnetic field distribution in accordance with the teachings hereof.

Figure 9:
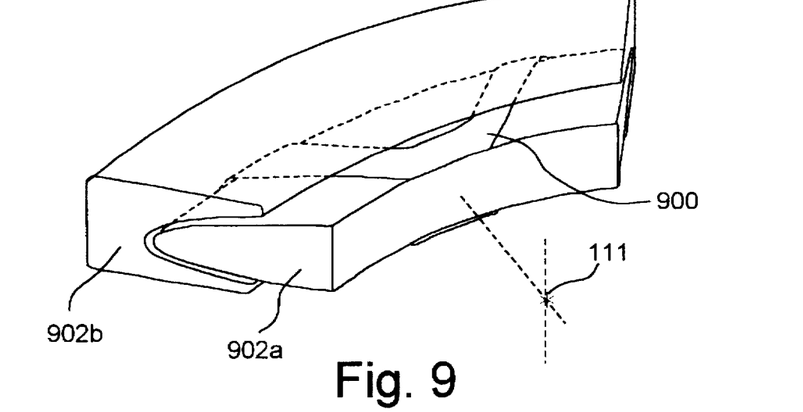
FIG. 9 is an isometric view of another embodiment of a low-inertia actuator coil and cooperating magnetic field producing structure.

FIG. 9 is an isometric view of another low-inertia actuator coil and magnetic field producing apparatus. In this instance, low-inertia actuator coil 900 is substantially V-shaped in cross section rather than U-shaped like the coil shown in FIGS. 4, and 6a and 6b. The V-shaped coil has two legs each having two portions for carrying current toward and away from axis 111, as well as sections that carry current parallel to axis 111. The V-shaped coil also has connecting portions. Magnetic circuit components 902a and 902b have a substantially V-shaped cross-sectional area that fits within the V-shape of coil 900.

Other alternative embodiments of a low-inertia actuator coil and magnetic field producing apparatus are possible. For example, a low-inertia actuator coil can have corrugated radially-extending legs. Such corrugations or ripples would increase the active length of the radially-extending legs provided the magnetic field distribution is appropriately generated to produce magnetic flux vectors perpendicular to such corrugations or ripples. With an increase in active length in the portion of coil that produces torque, the torque can be increased without a proportional increase in moment of inertia. The torque is proportional to the linear distance and the moment of inertia is proportional to the square of the distance of each area of the coil from the axis. The ripples in the coil can provide more torque by locating more current flow at a distance from the pivot axis. Adding ripples to the coil adds slightly to the mass and keeps the distance the same as a low-inertia actuator coil like coil 400. The moment of inertia raises slightly due to the added mass, but not greatly, since the distance from the axis of rotation is not increased. The moment of inertia would raise more dramatically if the length of the corrugated coil were increased to get additional torque.

Forming coil 400 will now be discussed. The method of forming the coil will be substantially the same regardless of the geometry of the finished coil. The considerations and method are equally applicable to all geometries of a low-inertia actuator coil. Initially, coil 400 is wound as a flat coil. Coil 400 is then folded and formed into its final three-dimensional geometry. One forming process is designed to provide ample support at the outer boundary of coil 400 in order to avoid wire creasing, wire stretching or de-lamination of the wire turns during the bending or folding of the coil. If the dimension of the coil cross-section in the plane of bending is small enough relative to the bending radius, the stretching or compression of the wire in the cross-section may be negligible or cause such small strains that they are insignificant. Normally, however, when forming a coil 400, the ratio between a characteristic cross-sectional dimension of the wire in the coil and the bending radius is large enough to cause strains, stretching, and de-lamination of the wire. This can be accounted for by making provisions to properly support and control the cross-section of the wires. If this is provided for, excessive strains, stretching and de-lamination can be lessened substantially during the forming of the coil.

When the ratio between the characteristic cross-section and the bending radius is large, the coil boundary is supported along selected sections of the wire of the coil by a mandrel or a series of mandrels. During the forming process, the shape of the cross-section of the wire is changed without changing the total area of the cross-section so that during the forming, deformation and strains that otherwise would tend to either stretch or compress the wires along the length of the wire, can be reduced significantly. An initially rectangular cross-section, for example, can be continuously distorted during the forming process into a rhomboidal cross 24 section. The resulting elongation or shortening of the wire largely compensates for the shortening of the coil at the inner radius of the bend and elongation of the coil at the outer radius of the bend or fold. Similarly, a bending in one sense at a section of the coil may be compensated for by a bending in the opposite sense in an adjacent section; or bending in a certain plane be may (partially) compensated for by bending in a plane angularly offset to the first one.

The deliberate control of the cross-sectional geometry during forming can also, when properly executed, reduce the slippage between wires in coil 400 and the relative longitudinal motion between adjacent wire turns in those sections of the coil most affected by fold forming.

The wire conductor used to form coil 400 can also be selected to lessen the effects of stress and strain resulting from bending. Generally, the conductor will be made of copper or aluminum, or some alloy of these two metals. If the coil bending is particularly severe, a wire cross-section consisting of a core of low mass aluminum and an outer layer of copper can be used. A square or rectangular wire can be used in making these coils since the finished coil is then able to carry more current than a coil made from a round wire. In either case, the copper layer, which is more ductile than the aluminum, makes the wire less susceptible to cracking when the wire is bent severely such as to a small radius. Typical wire sizes of interest for preferred embodiments include the 30 and 36 AWG sizes.

To provide the most economical finished coil, the insulation used on the wire should be a type commonly available and used in the coil winding industry. The insulation should preferably have a low friction coefficient between the wires to allow for some interwire slip during the forming or folding process. The low coefficient of friction on the wire may also be accomplished either by choosing an insulation material that, in its final state, as applied, has a low friction coefficient, or, an insulation material that is not yet fully cured during the coil forming operation, and which in its uncured condition exhibits a low friction coefficient when interposed between two moving wires. The uncured insulation forms an insulating layer after bending since capillary action keeps the uncured insulation distributed between the wires. The not fully cured insulation would act as a lubricant, whether dry or liquid in consistency, during the coil forming or folding process.

Coil 400 can also be formed without a mandrel. The coil may be formed by free form or by merely folding the coil without a mandrel. The coil could also be wound with a machine that winds and forms the coil by winding over a shaped surface. The machine would include a spool or source of conductive wire. A form that has the final cross-sectional shape would pivot about an axis transverse to the source of conductive wire. The form would also move from side to side along or parallel to the same axis. To facilitate winding of the coil, the form would be pivoted up and down to form the top and bottom of the coil. Movement from right to left while dispensing wire results in the legs of the coil being formed. The coil formed on a winding machine would, of course, still be within the scope of this invention. However, winding the coil onto a form with a articulating winding machine would not be as economical as winding a flat coil and then bending or folding the coil to form coil 400.

Figure 10:
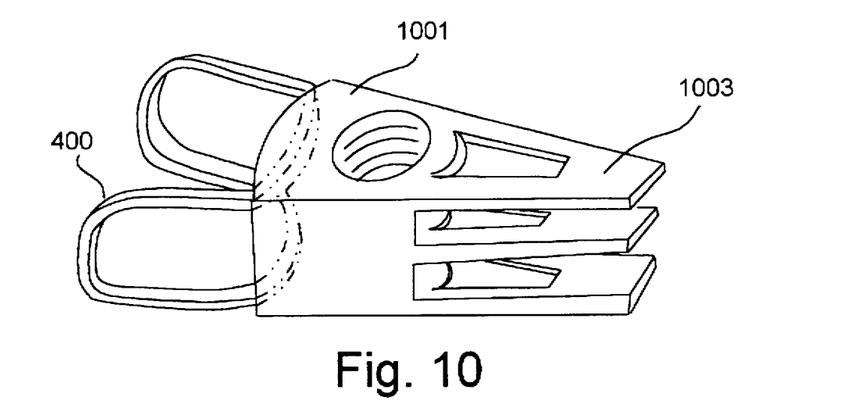
FIG. 10 is an isometric view of a subassembly made by an overmolding process in which a low-inertia actuator coil is overmolded into a plastic E-block.
Figure 11:
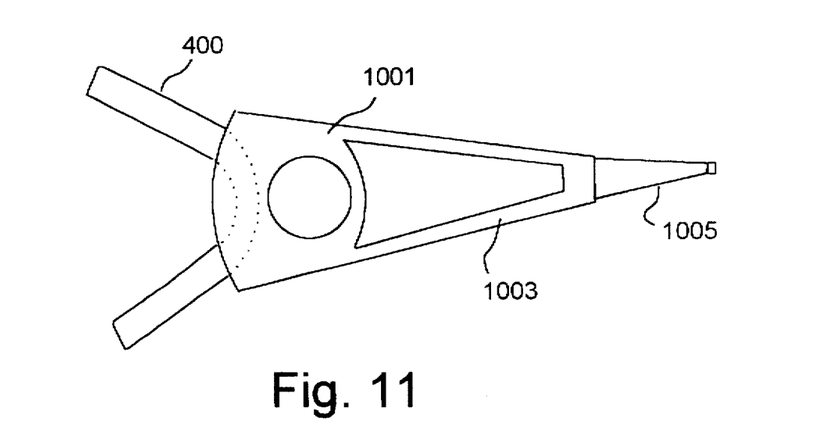
FIG. 11 is a plan view of a subassembly of a head stack assembly in which a head gimbal assembly has been attached to the subassembly of FIG. 10.

The finished coil 400 is structurally integrated into the HSA using various methods, such as overmolding, gluing, welding, staking, clamping, or a combination of such methods. FIG. 10 shows a coil 400 integrated into a subassembly that also includes an all-plastic E-block 1001 that is formed in a molding operation in which the circumferentially-extending legs of coil 400 are positioned within the mold so that a portion of the E-block overmolds a portion of coil 400. FIG. 11 shows a subassembly in which a head gimbal assembly 1005 has been attached to an arm 1003 of E-block 1001.

In an alternative method, after the coil is formed, legs 407 and 408 are pinched toward one another slightly. The pinching is done along an axis that is parallel to axis 11. The coil is then positioned at the rear portion of the HSA, and the pinching force is removed. Coil 400 springs back slightly and engages the rear portion of the HSA. The spring force of the coil provides positive locking while securely attaching the coil to the rear or forked end of the of the HSA and holds coil 400 in place temporarily. The next step is to place the HSA and coil 400 into a mold. The assembly is then over molded with a moldable structural plastic.

All portions of the coil situated in a magnetic field are subject to relatively large impulse forces during a seek operation. Consequently, it may be necessary to reduce the magnitude of and/or damp the induced elastic deformations of the coil structure. Such reinforcement and damping devices must be light-weight structures, with an extremely high specific stiffness and damping capacity. A preferred embodiment of the coil structure may incorporate a web-like structure spanning the distance between the two backward extending coil legs. Also, it is well within the scope of this invention to configure the permanent magnets interior to coil if desired instead of configuring the permanent magnets exterior to the coil.

We claim:

1. A head stack assembly for a disk drive having an enclosure, a disk having a recording surface, and means for generating a magnetic field distribution in an annular region within the enclosure, the head stack assembly comprising:
   a swing-type structure having a bore, the bore defining a bore axis;
   a head gimbal assembly cantilevered from the swing-type structure to project radially away from the bore axis, the head gimbal assembly including transducing structure for writing to and reading from the recording surface;
   a coil cantilevered from the swing-type structure to project radially away from the bore axis in a direction opposite from the head gimbal assembly; the coil having a shape to provide a current flow path that includes first and second multi-leg portions that are spaced from each other in a direction parallel to the bore axis, each of the multi-leg portions being generally C-shaped, substantially perpendicular to the bore axis, open at its end that is remote from the bore axis, and including two radially-extending legs such that the current flow path provides four radially-extending legs with the four radially-extending legs being positioned such that upon installation of the head stack assembly into the disk drive the four radially-extending legs occupy the annular region.

2. The head stack assembly of claim 1, wherein the current flow path includes a pair of substantially axially-extending legs each connecting a pair of radially-extending legs in series.

3. The head stack assembly of claim 2, wherein each substantially axially-extending leg is substantially U-shaped and opens toward the bore axis.

4. The head stack assembly of claim 1, wherein the current flow path has a generally flat shape through a first of the four radially-extending legs, a generally flat shape through a second of the four radially-extending legs, and has a connecting leg between the first and the second legs, the connecting leg having a generally U-shape.

5. The head stack assembly of claim 1, wherein the current flow path has a generally flat shape through a first of the four radially-extending legs, a generally flat shape through a second of the four radially-extending legs, and has a connecting leg between the first and the second legs, the connecting leg having a generally flat shape.

6. The head stack assembly of claim 1, wherein the current flow path has a generally V-shaped portion comprising a connecting leg in series between a first and a second of the four radially-extending legs.

7. A head disk assembly for a disk drive comprising:
   an enclosure;
   a disk having a recording surface;
   a pivot bearing cartridge affixed to the enclosure and defining a pivot axis;
   a head stack assembly having a bore surrounding the pivot bearing cartridge, transducing structure, cantilevered structure for supporting the transducing structure in position over a selected area of the recording surface, and a coil cantilevered to project away from the pivot axis in a direction opposite from the cantilevered structure;
   the coil having a shape to provide a current flow path that includes first and second multi-leg portions that are spaced from each other in a direction parallel to the pivot axis, each of the multi-leg portions being generally C-shaped, substantially perpendicular to the pivot axis, open at its end that is remote from the pivot axis, and including two radially extending legs such that current flow path provides four radially-extending legs; and
   means for generating a magnetic field distribution in an annular region such that through a predetermined arc two of the four radially-extending legs occupy a substantially uniform magnetic field having a first direction and the other two of the four radially-extending legs occupy a substantially uniform magnetic field having a second, opposite direction.

8. The head disk assembly of claim 7, wherein the current flow path includes a pair of substantially axially-extending legs each connecting a pair of radially-extending legs in series.

9. The head disk assembly of claim 8, wherein each substantially axially-extending leg is substantially U-shaped and opens toward the bore axis.

10. The head disk assembly of claim 7, wherein the current flow path has a generally flat shape through a first of the four radially-extending legs, a generally flat shape through a second of the four radially-extending legs, and has a connecting leg between the first and the second legs, the connecting leg having a generally U-shape.

11. The head disk assembly of claim 7, wherein the current flow path has a generally flat shape through a first of the four radially-extending legs, a generally flat shape through a second of the four radially-extending legs, and has a connecting leg between the first and the second legs, the connecting leg having a generally flat shape.

12. The head disk assembly of claim 7, wherein the current flow path has a generally V-shaped portion comprising a connecting leg in series between a first and a second of the four radially-extending legs.

13. The head disk assembly of claim 7, wherein the generating means includes a nested support structure comprising inner and outer yokes and a plurality of permanent magnets positioned between the inner and outer yokes.

14. The head disk assembly of claim 7, wherein the generating means includes a nested support structure comprising inner and outer yokes and a plurality of permanent magnets positioned between the inner and outer yokes, the magnets having major surfaces defining magnetic north and magnetic south poles.

15. The head disk assembly of claim 14, wherein the permanent magnets are supported by the outer yoke.

16. The head disk assembly of claim 7, wherein the current flow path includes a pair of substantially axially-extending legs each connecting a pair of radially-extending legs in series, and wherein the generating means includes a nested support structure comprising inner and outer yokes and a plurality of permanent magnets positioned between the inner and outer yokes, including permanent magnets facing the substantially axially-extending legs.

17. A disk drive comprising:
   an enclosure;
   a disk having a recording surface;
   a pivot bearing cartridge affixed to the enclosure and defining a pivot axis;
   a head stack assembly having a bore surrounding the pivot bearing cartridge, transducing structure, cantilevered structure for supporting the transducing structure in position over a selected area of the recording surface, and a coil cantilevered to project away from the pivot axis in a direction opposite from the cantilevered structure;

the coil having a shape to provide a current flow path that includes first and second multi-leg portions that are spaced from each other in a direction parallel to the pivot axis, each of the multi-leg portions being generally C-shaped, substantially perpendicular to the pivot axis, open at its end that is remote from the pivot axis, and including two radially extending legs such that current flow path provides four radially-extending legs; and means for generating a magnetic field distribution in an annular region such that through a predetermined arc two of the four radially-extending legs occupy a substantially uniform magnetic field having a first direction and the other two of the four radially-extending legs occupy a substantially uniform magnetic field having a second, opposite direction; and circuit means for supplying current to flow through the coil to produce torque about the pivot axis.

18. The disk drive of claim 17, wherein the current flow path includes a pair of substantially axially-extending legs each connecting a pair of radially-extending legs in series.

19. The disk drive of claim 18, wherein each substantially axially-extending leg is substantially U-shaped and opens toward the bore axis.

20. The disk drive of claim 17, wherein the current flow path has a generally flat shape through a first of the four radially-extending legs, a generally flat shape through a second of the four radially-extending legs, and has a connecting leg between the first and the second legs, the connecting leg having a generally U-shape.

21. The disk drive of claim 17, wherein the current flow path has a generally flat shape through a first of the four radially-extending legs, a generally flat shape through a second of the four radially-extending legs, and has a connecting leg between the first and the second legs, the connecting leg having a generally flat shape.

22. The disk drive of claim 17, wherein the current flow path has a generally V-shaped portion comprising a connecting leg in series between a first and a second of the four radially-extending legs.

* * * * *